(12) United States Patent
Kuzmin (10) Patent No.: US 6,983,455 B2
(45) Date of Patent: Jan. 3, 2006

(54) MECHANISM FOR PROFILING COMPUTER CODE

(75) Inventor: Aleksandr M. Kuzmin, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 624 days.

(21) Appl. No.: 10/120,823

(22) Filed: Apr. 10, 2002

(65) Prior Publication Data

US 2003/0196193 A1 Oct. 16, 2003

(51) Int. Cl.
*G06F 9/44* (2006.01)

(52) U.S. Cl. ...................... 717/130; 717/131; 717/132; 717/133

(58) Field of Classification Search ................ 717/130, 717/131, 132, 133
See application file for complete search history.

(56) References Cited

U.S. PATENT DOCUMENTS

| | | | | |
|---|---|---|---|---|
| 5,517,629 A | * | 5/1996 | Boland | 714/38 |
| 5,613,118 A | * | 3/1997 | Heisch et al. | 717/158 |
| 5,933,640 A | * | 8/1999 | Dion | 717/132 |
| 5,960,198 A | * | 9/1999 | Roediger et al. | 717/130 |
| 6,009,514 A | * | 12/1999 | Henzinger et al. | 714/47 |
| 6,016,474 A | * | 1/2000 | Kim et al. | 717/127 |
| 6,049,666 A | * | 4/2000 | Bennett et al. | 717/130 |
| 6,126,329 A | * | 10/2000 | Bennett et al. | 717/130 |
| 6,161,200 A | * | 12/2000 | Rees et al. | 717/130 |
| 6,170,083 B1 | * | 1/2001 | Adl-Tabatabai | 717/158 |
| 6,189,142 B1 | * | 2/2001 | Johnston et al. | 717/125 |
| 6,199,199 B1 | * | 3/2001 | Johnston et al. | 717/125 |

OTHER PUBLICATIONS

Wu et al., "Static Branch Frequency and Program Profile Analysis", 1994, ACM, p. 1-11.*
Ball et al., "Optimally Profiling and Tracing Programs", 1994, ACM, p. 1319-1360.*

* cited by examiner

*Primary Examiner*—Tuan Dam
*Assistant Examiner*—Qamrun Nahar
(74) *Attorney, Agent, or Firm*—Hickman Palermo Truong & Becker, LLP (57) ABSTRACT

A set of computer code is profiled by breaking each code segment of the computer code down into basic instructions. Thereafter, the set of computer code is executed. As each code segment is executed, a log is updated to indicate execution of that code segment. This is done for each executed code segment; thus, at the end of execution, the log reflects all of the code segments that were executed, and how many times each code segment was executed. Using the log, and a set of calibration statistics, which specify how much processing time is consumed by each basic instruction, an overall execution cost is derived for each executed code segment. The set of overall execution costs for all of the executed code segments are incorporated into an overall profile for the set of computer code.

18 Claims, 4 Drawing Sheets

MECHANISM FOR PROFILING COMPUTER CODE

FIELD OF THE INVENTION

This invention relates generally to computer systems, and more particularly to a mechanism for profiling computer code.

BACKGROUND

Profiling mechanisms are used on a regular basis in the software industry to aid in the development of more efficient programs. With a profiling mechanism, it is possible to ascertain how much processing time is being spent on each part of a program. Armed with this information, a software developer can locate bottlenecks in the program, and can revise the code in the bottlenecks to make the program run more efficiently.

In a typical profiling mechanism, profiling is carried out using a log and a timer. More specifically, as each operation of a program is executed, a timer is started. When the operation completes execution, the timer is stopped. From the start time and the end time, the processing time of the operation is determined, and the processing time is recorded in the log in association with the operation. By doing this for all of the operations that are executed in the program, the profiling mechanism derives a complete execution profile for the program, which includes a list of all of the operations that were executed, and the total amount of time spent on executing each operation.

Typically, a profiling mechanism (which usually takes the form of a set of program code) is executed on the same machine as the program that is being profiled. Thus, in order for the profiling mechanism to work properly, that machine needs to have a timer that the profiling mechanism can invoke to time the execution of the operations.

In a profiling mechanism that profiles object-oriented programs, an operation goes down as far as the method level. Thus, whenever a method is invoked, a timer is started. When the method returns, the timer is stopped. Based upon the start time and the end time, the profiling mechanism determines how much processing time was consumed by the method. The processing time is thereafter recorded in the log in association with the method. This is done each time a method is invoked. Thus, by the end of program execution, the profiling mechanism has a list of all of the methods that were invoked, and the total amount of processing time spent on each method.

The profiling methodology discussed above is effective for some implementations; however, for many other implementations, it has a number of significant drawbacks. A first drawback is that, in order to be accurate, the methodology requires a timer with a high degree of precision. Since some methods can be quite simple and hence, can be executed in a very short period of time (e.g. microseconds), the timer needs to have a high degree of precision in order for the profile to be accurate. As noted above, the profiling mechanism is typically executed on the same machine as the program that is being profiled. This means that that machine needs to have a timer with a high degree of precision. If the machine is a low cost or low capability device (such as a cellular phone or a personal digital assistant (PDA)), it may not have such a high precision timer. In that case, the profile derived from running the profiling mechanism on that machine will not be very accurate or useful.

Another shortcoming of the above methodology is that the overhead of starting and stopping the timer each time a method is invoked can add significant error to the profiling results. For example, if a method takes only 50 microseconds to run but the overhead of starting and stopping the timer is itself 50 microseconds, then the profiling mechanism will indicate that the method took 100 (rather than 50) microseconds to run, which represents a 100% error. Many methods in a program can be fast-executing methods; thus, the error caused by the timer overhead can have a substantial impact on the profile results.

Yet another shortcoming is that even if the profile results are completely accurate, they may still not be very useful to a developer. As noted above in connection with the discussion on object-oriented programs, current profiling mechanisms only provide profiling information down to the method level. They do not go as low as the source code line level. As a result, if a particular method having a large number of lines of code is identified as being a bottleneck in the program, the developer still does not have a good idea of what is causing the bottleneck. He knows that the cause is within that method, but he does not know which lines of code represent the source of the problem. As a result, the developer may still need to do a large amount of experimentation before he can isolate and eliminate the cause of the bottleneck.

From the above discussion, it is clear that the current profiling methodology leaves much to be desired. As a result, an improved computer code profiling methodology is needed.

SUMMARY

To overcome the shortcomings of the prior art, there is provided an improved profiling methodology, which enables profiling to be performed efficiently and accurately. In one embodiment, profiling is achieved in multiple phases.

In a calibration phase, the average execution time of each basic instruction of a particular computer language is determined. To elaborate, each statement or high-level instruction of a computer language ultimately breaks down into one or more basic instructions. For example, an "if" statement may break down into multiple "load register" instructions and one or more "compare" instructions. The "load register" and "compare" instructions are basic instructions. For any particular computer language, there is a finite set of basic instructions, and each statement in that language ultimate breaks down into one or more of these basic instructions. If it is determined how much average execution time is consumed by each basic instruction, and if it is known how each statement in the computer language breaks down into basic instructions, then it can be determined how much average execution time is consumed by each statement. In one embodiment, the calibration phase is carried out on the machine on which a profiled program is to be run. At the end of the calibration phase, a set of calibration statistics are derived, which specify the average execution time of each basic instruction on that particular machine.

After the calibration statistics are derived, a profiling phase is entered. In the profiling phase, a set of computer code is profiled to determine how much execution time is being consumed by each code segment in the source code. In one embodiment of the profiling phase, each code segment is broken down into its component basic instructions. Thereafter, the set of computer code is executed (execution of the computer code may be carried out on the machine on which calibration was performed, or on another machine).

As each code segment is executed, a log is updated to indicate execution of that code segment. This is done for each code segment that is executed; thus, at the end of execution, the log reflects all of the code segments that were executed, and how many times each code segment was executed.

As noted above, each code segment is broken down into its component basic instructions. With the calibration statistics, it is known how much average execution time is consumed by each basic instruction. With these two sets of information, it is possible to determine how much average execution time is consumed by each code segment. With this information, and the execution log, which specifies what code segments were executed and how many times each code segment was executed, it is possible to determine how much total execution time was consumed by each code segment. In this manner, a complete profile of the computer code is derived. Once derived, the profile may be used by a developer to find bottlenecks in the code, and to refine the code to improve execution efficiency.

DETAILED DESCRIPTION OF EMBODIMENT(S)

Conceptual Overview

Figure 1:
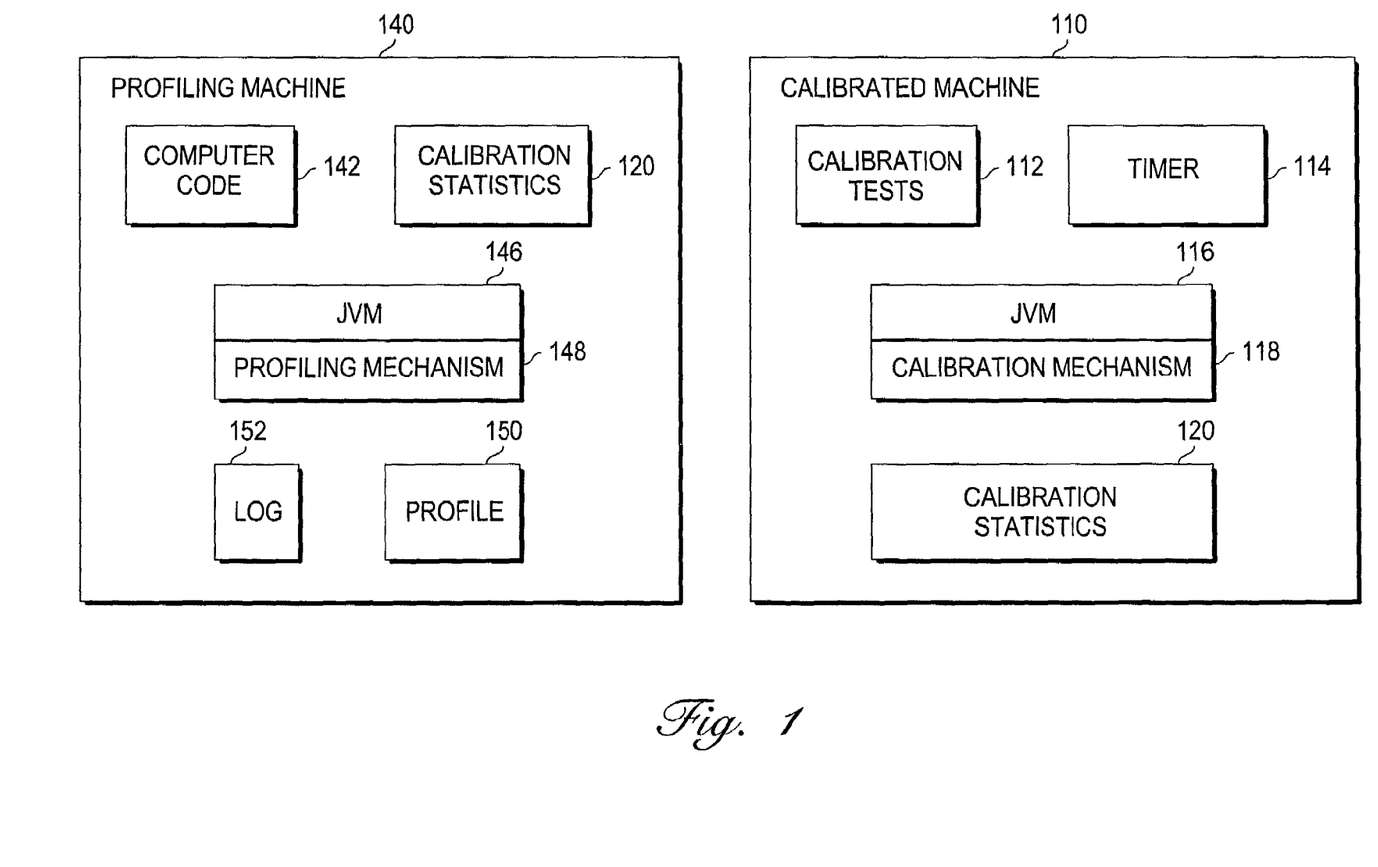
FIG. 1 shows a functional overview of one embodiment of the present invention, including a calibrated machine and a profiling machine.

FIG. 1 shows a functional overview of one embodiment of the present invention. In the following discussion of FIG. 1, it will be assumed for illustrative purposes that the invention is implemented in a Java environment based upon the Java programming language developed by Sun Microsystems, Inc. of Palo Alto, Calif. It should be noted, however, that the invention is not so limited. Rather, the concepts taught herein may be applied generally to any programming language in any type of computer environment.

FIG. 1 shows a calibrated machine 110 and a profiling machine 140. The calibrated machine 110 is the machine on which a set of computer code 142 will eventually be run (e.g. a server, a workstation, a PDA, a cellular phone, etc.), and the profiling machine 140 is the machine on which the set of computer code 142 is profiled. In FIG. 1, the calibrated machine 110 and the profiling machine 140 are shown as different machines. It should be noted, however, that they could be the same machine; that is, both the calibration function and the profiling function could be carried out on the same machine if so desired. In the following discussion, it will be assumed for illustrative purposes that computer code 142 is Java source code, which is interpreted by a Java virtual machine (JVM) during runtime. However, this is not required. The concepts taught herein may be applied to any type of computer code (e.g. source, compiled, object, etc.).

As shown in FIG. 1, the calibrated machine 110 comprises a JVM 116, a calibration mechanism 118, a set of calibration tests 112 developed by a test engineer, and a timer 114. In one embodiment, the calibration mechanism 118 works in conjunction with the JVM 116 to run the set of calibration tests 112. As the tests are run, the calibration mechanism 118 invokes the timer 114 to time the tests. After all of the calibration tests 112 are run, the calibration mechanism 118 processes the results of the tests to derive a set of calibration statistics 120. As will be explained further below, the calibration statistics 120 specify the average processing time that each basic instruction consumes on the calibrated machine 110. Thus, by the end of the calibration process or phase, it is known how much average processing time is needed to execute each basic instruction on the calibrated machine 110. The calibration statistics 120 are thereafter used by the profiling machine 140 to generate a profile for the computer code 142.

As shown in FIG. 1, the profiling machine 140 comprises a JVM 146, a profiling mechanism 148, and a set of computer code 142 that is to be profiled. Working together, the JVM 146 and the profiling mechanism 148 process the computer code 142 and the calibration statistics 120 to derive a profile 150 for the computer code 142. In one embodiment, the profile 150 is derived as follows.

Initially, each code segment of the computer code 142 is broken down into its component basic instructions. As used herein, code segment means a portion of the computer code 142. A code segment may be as low level as a line of source code, a source code statement, etc. After the code segments are decomposed into basic instructions, the JVM 146 executes the computer code 142. As each code segment is executed, the profiling mechanism 148 updates a log 152 to indicate execution of that code segment. This is done for each code segment that is executed; thus, by the end of execution of the computer code 142, the log 152 reflects all of the code segments that were executed, and how many times each code segment was executed.

As noted above, each code segment is broken down into its component basic instructions. With the calibration statistics, it is known how much average processing time is consumed by each basic instruction. With these two sets of information, the profiling mechanism 148 determines how much average processing time is consumed by each execution of each code segment. With this information, and the execution log, which specifies what code segments were executed and how many times each code segment was executed, the profiling mechanism 148 determines how much total processing time was consumed by each executed code segment. By compiling all of this information together, the profiling mechanism 148 derives the profile 150 for the computer code 142.

Several aspects of profile 150 should be noted. First, note that it is not limited to being a method level profile. Instead, it can go down as far as the source code line level (recall that a code segment may be a line of source code). Thus, in contrast to the prior art, the profiling mechanism 148 is able to provide profile information down to specific lines of source code. With such a profile 150, a developer can quickly and easily identify specific lines of source code that are giving rise to a bottleneck. The developer no longer needs to experiment with different lines of code in a large method to discover the source of the bottleneck. Another aspect to note is that in generating the profile 150, the profiling mechanism 148 does not need to invoke a timer. Instead, the profiling mechanism 148 relies on the log 152 and the calibration statistics 120. Because no timer is needed, the problems noted previously with regard to timers are eliminated. Yet another point to note is that the profile

150 is not a profile for the computer code 142 on the profiling machine 140. Instead, the profile 150 is a profile for the computer code 142 on the calibrated machine 110 (recall that the calibration statistics are for the calibrated machine 110, not the profiling machine 140). What this means is that a set of computer code 142 does not need to be profiled on the machine on which it will eventually be run, but rather may be profiled on another machine. This is useful in many situations (for example, when it is undesirable or infeasible to profile a program on the calibrated machine, or when it is desirable to use a single machine to generate profiles for many other machines). This sets forth just a few of the advantages provided by this embodiment of the present invention. More advantages will become apparent as the embodiment is described in greater detail.

Calibration Mechanism

As mentioned above, one of the main functions of the calibration mechanism 118 is to derive the set of calibration statistics 120. As noted, the calibration statistics 120 specify how much average processing time is consumed to execute each basic instruction on the calibrated machine 110. To understand how the calibration mechanism 118 carries out the calibration function, it is first necessary to understand the concept of a "basic instruction".

Discussion of "Basic Instructions"

Every computer language, such as Java, provides a plurality of high level commands, instructions, or statements that a computer programmer can use to write a program in that language. These commands may be, for example, an "if" command, a "call" command, or the like. Using high level commands, a programmer writes lines of source code to specify the functionality of a particular program. Each line of source code includes one or more high level commands. High level commands make logical sense to human programmers. However, they are not executed directly by machines. Instead, machines decompose the high level commands into low level, basic instructions, and it is these basic instructions that are executed by the machine. As an example, an "if" statement may decompose into several low level "load register" instructions and a low level "compare" instruction. These low level instructions are the basic instructions that are executed by the machine. For the Java programming language, the basic instructions are called byte codes. It is the byte codes that are executed by a JVM.

For any particular computer language, there is a finite set of basic instructions. Thus, for any version of Java, there is a finite set of byte codes. Every command or statement in that language ultimately breaks down into one or more of these basic instructions. Thus, every line of source code can be decomposed into one or more basic instructions. Because every line of source code decomposes into one or more basic instructions, if it is known how much average processing time is consumed by each basic instruction, then it can be determined how much average processing time is consumed by each execution of each line of source code. In one embodiment, it is this strategy (rather than invoking a timer) that is used to determine how much processing time is consumed in executing each line of source code.

Deriving Calibration Statistics

The above strategy relies upon the existence of a set of calibration statistics, which set forth how much average processing time is consumed by each basic instruction on a particular calibrated machine. From a conceptual standpoint, determining how much processing time is consumed by each basic instruction of a computer language is a simple matter. From a practical standpoint, however, it is a difficult task.

A straightforward approach would be to simply time each basic instruction, that is, to cause the JVM 116 to execute a particular byte code, and to time how long it takes for the execution to complete. This approach does not work very well, however, because it is extremely difficult if not impossible to obtain an accurate time. The execution of a byte code is usually quite fast so that the overhead of starting and stopping a timer would far outweigh the execution time of the byte code. As result, an accurate measure of the byte code execution time cannot be obtained.

To circumvent this problem, the calibration mechanism 118 does not try to time an individual execution of a byte code. Instead, it times the execution of a very large number of executions of a byte code, and divides the execution time by the number of times the byte code was executed. This gives an average execution time. Because the byte code is executed many times, the overall execution time will be relatively large. Thus, the overhead of starting and stopping a timer will not add much error to the results. In addition, because the overall execution time is relatively large, a relatively low precision timer can be used to do the timing.

For those basic instructions that can be executed individually and iteratively, this approach is quite effective. However, there are many byte codes that cannot be executed on their own. Instead, they need to be executed in conjunction with other byte codes. For these byte codes, a slightly different approach is needed. In one embodiment, the problem is solved using a linear algebraic matrix approach. This approach is illustrated in FIG. 2.

Figure 2:
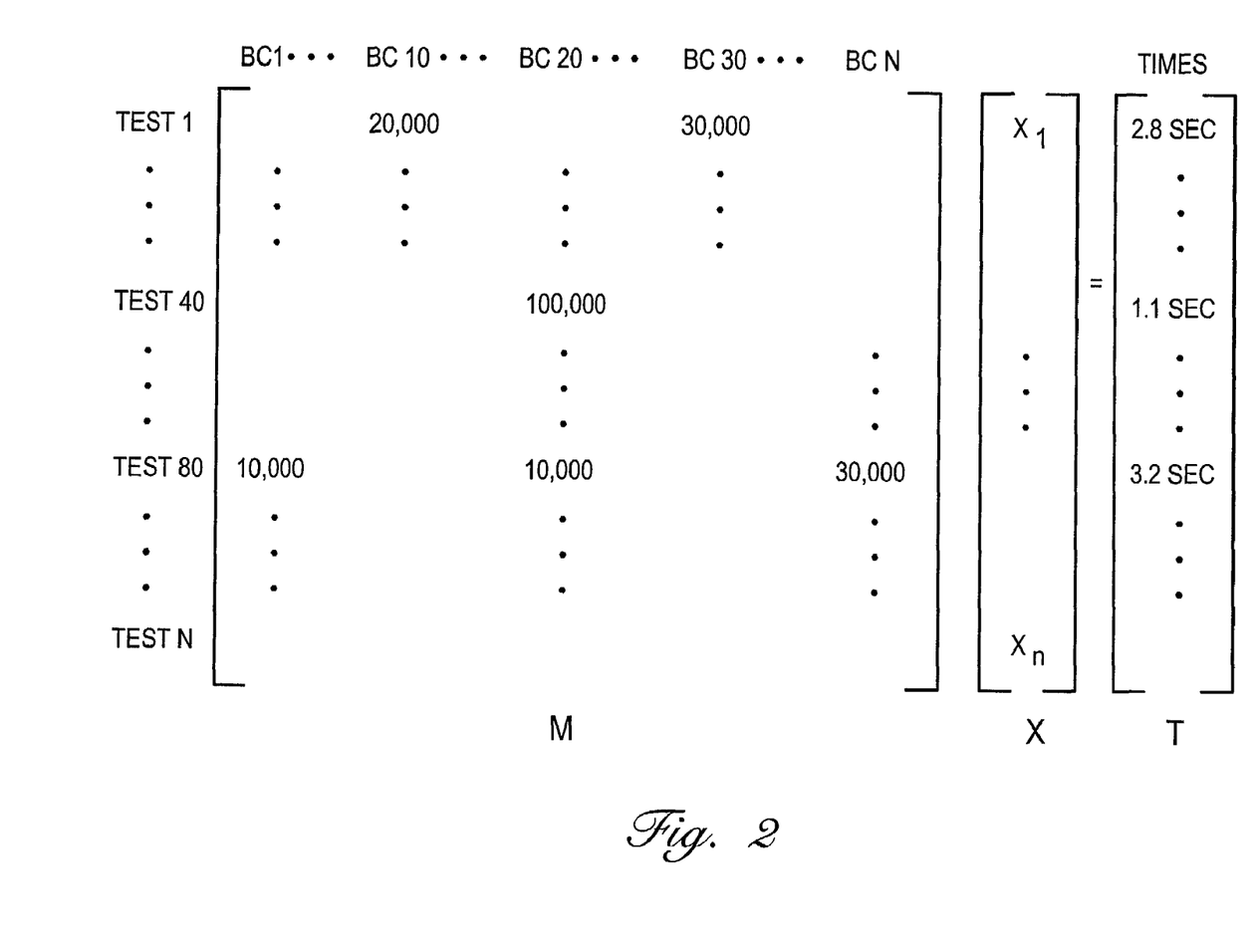
FIG. 2 shows a diagrammatic representation of a matrix approach that may be used to derive a set of calibration statistics.

As shown, FIG. 2 comprises a matrix M having an n number of columns and an n number of rows. Each column represents a particular byte code (BC), and each row represents one of the calibration tests 112 (FIG. 1). In matrix M, it is assumed that there are an n number of total byte codes in a particular version of Java, where n may be any integer. FIG. 2 also comprises a matrix T, which has one column and n rows. Together, the matrices M and T contain the details and results of each calibration test 112. For example, in test 1, there were 20,000 executions of byte code 10 and 30,000 executions of byte code 30, and the test took 2.8 seconds to complete. Similarly, in test 80, there were 10,000 executions of byte code 1, 10,000 executions of byte code 20, and 30,000 executions of byte code n, and the test took 3.2 seconds to complete.

Given any individual row, it is most likely not possible to determine how much average execution time was consumed by a particular byte code. For example, in test 1, it is known that the overall test took 2.8 seconds to complete, but it is not known what portion of that time was consumed by byte code 10 and what portion was consumed by byte code 30. Thus, it is not possible to determine the average execution time of either byte code. However, if there are a plurality of rows, and if the rows are minimal linearly independent sets of tests, it is possible to use linear algebra to solve a matrix equation to determine the average execution time of each byte code.

To illustrate, suppose there is a matrix X (as shown in FIG. 2) having one column and n rows, and that matrix X represents the average execution time of each byte code (i.e. $X_1$ is the average execution time of byte code 1, $X_n$ is the average execution time of byte code n, and so on). In such a case, the following matrix equation holds: MX=T. As noted above, matrices M and T represent the details and results of the calibration tests 112; thus, the values of M and T are known. That being the case, it is possible to solve for matrix X using linear algebra. Once the values of matrix X are known, the average execution time of each byte code is known. In this manner, the calibration statistics 120 are derived.

As noted previously, the calibration tests 112 are developed by a test engineer. It will be up to the test engineer to develop the set of tests such that: (1) the tests test all of the possible byte codes; and (2) the tests produce rows in matrix M that are minimal linearly independent. If these conditions are met, then the average execution time of each byte code on a particular calibrated machine can be determined. The calibration statistics 120 are thus derived.

Profiling Mechanism

After the calibration statistics 120 are derived, they are used by the profiling machine 140 to generate a profile for the set of computer code 142. The flow diagram of FIG. 3 shows how the computer code 142 may be profiled in accordance with one embodiment of the present invention.

Figure 3:
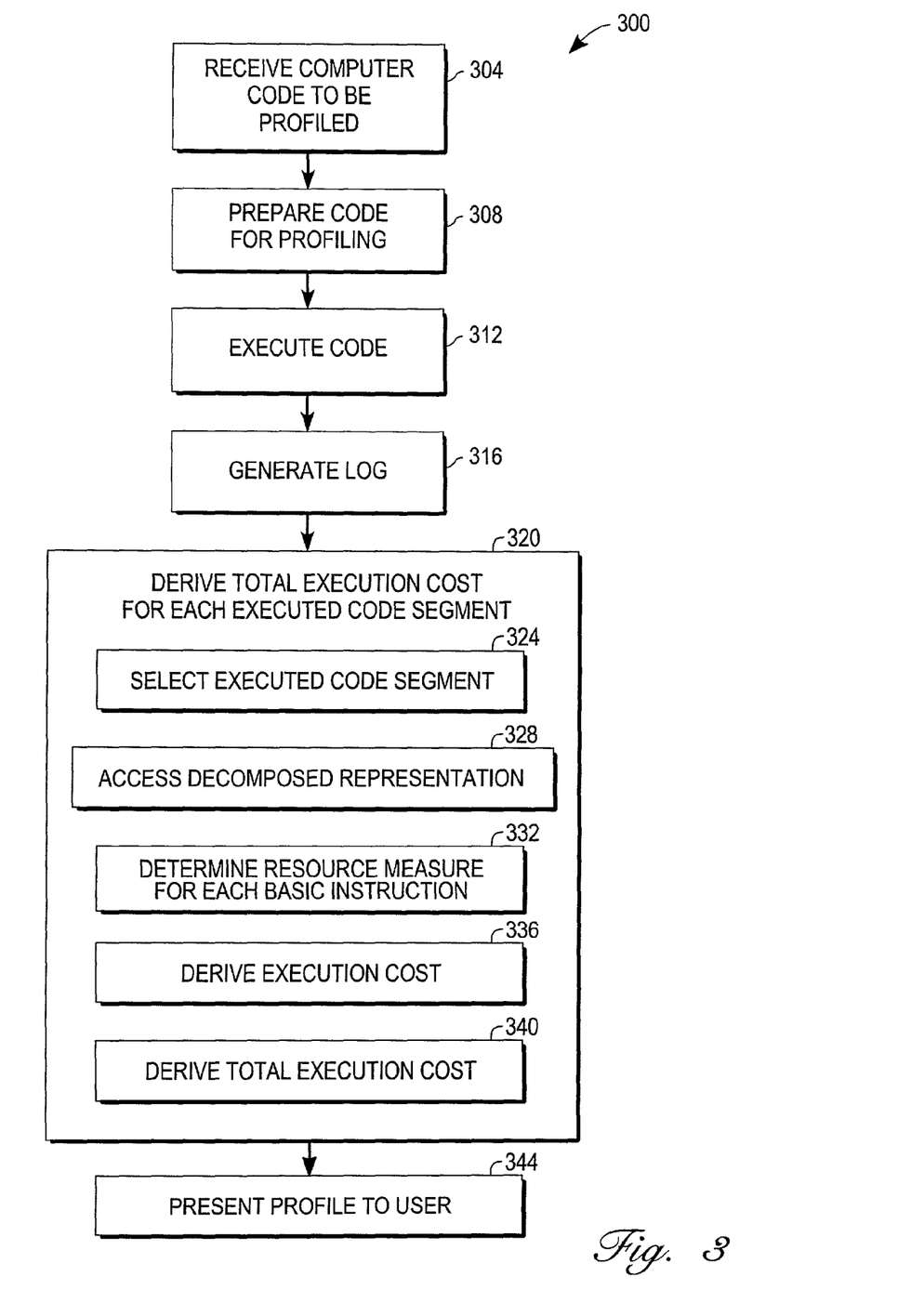
FIG. 3 is a flow diagram of a profiling phase in accordance with one embodiment of the present invention.

As shown in FIG. 3, the profiling machine 140 initially receives (304) the computer code 142 to be profiled. As noted previously, computer code 142 is assumed to be Java source code for the sake of illustration. After the code 142 is received, the JVM 146 and the profiling mechanism 148 prepare (308) the code 142 for profiling. In one embodiment, the code 142 is prepared by assigning an identifier (e.g. an index) to each code segment. In this example, a code segment is a line of source code. This identifier enables each code segment to be uniquely identified. In addition, each code segment 142 is decomposed into the basic instructions that make up the code segment. Specifically, in the present example, the JVM 146 compiles each line of Java source code 142 into individual byte codes. In one embodiment, the decomposed representation of each code segment is associated with the identifier for that code segment, and is stored away for subsequent reference.

After compiling the Java source code 142, the JVM 146 executes (312) the byte codes to implement the logic of the code 142. During code execution, the profiling mechanism 148 generates (316) an execution log 152. Specifically, as each code segment is executed, the profiling mechanism 148 records the identifier associated with that code segment in the log 152. By doing this for all of the code segments that are executed, the profiling mechanism 148 creates a complete execution log, which specifies what code segments were executed, and how many times each code segment was executed.

After the log 152 is generated, the profiling mechanism 148 proceeds to derive (320) a total execution cost for each executed code segment. To do so, the profiling mechanism 324 initially selects (324) from the log 152 an identifier associated with a particular executed code segment. Using this identifier, the profiling mechanism 148 accesses (328) the decomposed representation for the code segment (recall that the decomposed representation was previously stored in association with the identifier). The decomposed representation sets forth the basic instructions (i.e. the byte codes) that make up the code segment.

Thereafter, the profiling mechanism 148 determines (332) a resource measure for each of the basic instructions that make up the code segment. Basically, a resource measure for a basic instruction provides an indication of how much processing resources (e.g. how much processing time) are consumed in executing that basic instruction. To determine the resource measures, the profiling mechanism 148 accesses the calibration statistics 120. As noted previously, the calibration statistics 120 specify how much processing time is consumed by each basic instruction (i.e. each byte code). Thus, using the calibration statistics 120, the profiling mechanism 148 determines a resource measure for each of the basic instructions that make up the code segment.

Once that is done, the profiling mechanism 148 knows: (1) what basic instructions make up the code segment; and (2) the resource measure for each of those basic instructions. Based on these two sets of information, the profiling mechanism 148 derives (336) an execution cost for the code segment. For example, if the code segment is made up of one byte code 1 and one byte code n, and the resource measure for byte code 1 is 10 microseconds and the resource measure for byte code n is 15 microseconds, then the execution cost for the code segment is 25 microseconds. This execution cost provides an indication of how much processing resources are consumed each time that code segment is executed.

After the per-execution cost of the code segment is derived, an overall execution cost for the code segment is derived. More specifically, a code segment may be executed more than once. If that is the case, then the overall execution cost of the code segment is the per-execution cost of the code segment multiplied by the number of times the code segment was executed. To determine the number of times the code segment was executed, the profiling mechanism 148 consults the log 120.

In the manner described, the profiling mechanism 148 derives an overall execution cost for an executed code fragment. Operation (320) is carried out for each executed code segment. By the time operation (320) is completed, a complete profile 150 for the computer code 142 is derived. This profile 150 may then be presented (344) to a user or developer for use in locating bottlenecks or problem areas in the code. In one embodiment, the profile comprises two components: a source code component and an execution cost component. Both of these components are presented to a user to facilitate use of the information. For example, each line of source code may be displayed, with the overall execution cost of that line of source code displayed next to the source code. That way, a user can easily determine the execution cost of each line of source code.

The overall execution cost may be presented in many different ways. For example, it may be shown as an absolute execution cost (e.g. in units of processing time). Alternatively, it may be shown as a percentage of overall execution cost (e.g. divide the execution cost of the line of source code by the combined execution cost of all of the lines of source code). These and other ways of presenting the execution cost information are within the scope of the present invention.

Thus far, the profiling machine 140 has been discussed with reference to only one set of calibration statistics 120. It should be noted that the profiling machine 140 may have a plurality of sets of calibration statistics, with each set corresponding to a different calibrated machine. With such a setup, the profiling machine 140 can generate a profile for the computer code 142 for a plurality of different calibrated machines.

Likewise, the profiling machine 140 may receive a plurality of sets of computer code 142. In that case, the profiling machine 140 can generate a profile for a plurality of different sets of computer code 142 for a plurality of different calibrated machines. These and other uses of the profiling machine 140 are within the scope of the present invention.

Hardware Overview

Figure 4:
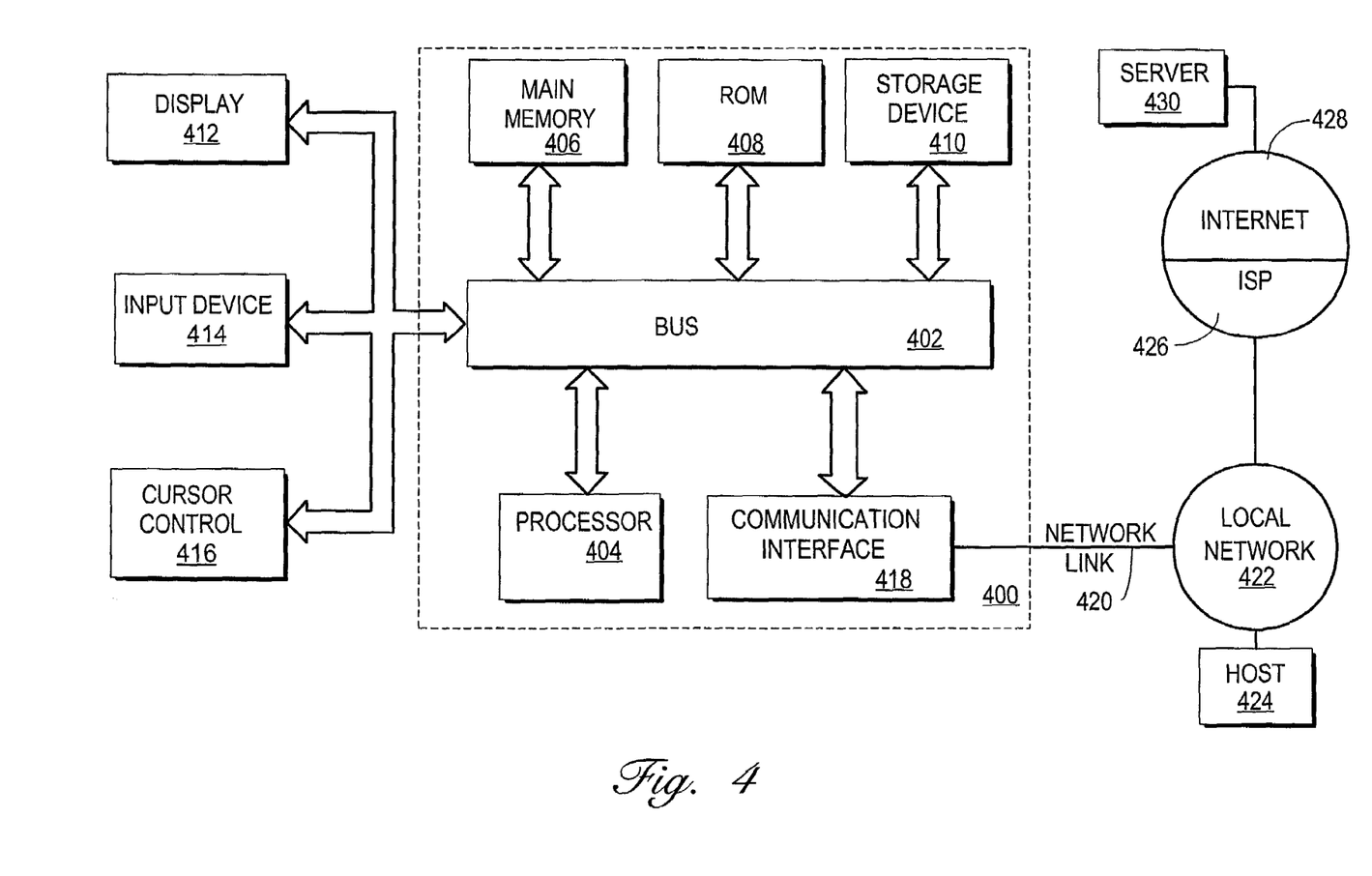
FIG. 4 is a hardware block diagram of a computer system in which one embodiment of the present invention may be implemented.

In one embodiment, the various components (e.g. JVM 116, 146, profiling mechanism 148, and calibration mechanism 118) shown in FIG. 1 are implemented as sets of instructions executable by one or more processors. The components may be implemented as part of an object oriented programming system, including but not limited to the JAVA™ programming system manufactured by Sun Microsystems, Inc. of Palo Alto, Calif. FIG. 4 shows a hardware block diagram of a computer system 400 in which one embodiment of the profiling machine 140 and/or the calibrated machine 110 may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 may also be further used to store temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method for profiling a set of computer code, comprising:

executing a set of computer code;
generating an execution log for the set of computer code, wherein the execution log comprises information indicating how many times a code segment within the set of computer code was executed;
selecting said code segment from the execution log after execution of the set of computer code has completed;
accessing a decomposed representation of said code segment, said decomposed representation specifying one or more basic instructions that are executed to execute said code segment;
determining a resource measure for each of the basic instructions specified in said decomposed representation, wherein a resource measure for a basic instruction provides an indication of an amount of processing resources consumed in executing that basic instruction once;
deriving, based upon said decomposed representation and the resource measures, an execution cost for said code segment, wherein said execution cost provides an indication of an amount of processing resources consumed in executing said code segment once; and
deriving, based upon said execution cost and how many times said code segment was executed, a total execution cost for said code segment.

2. The method of claim 1, wherein said method is carried out without invoking a timing mechanism.

3. The method of claim 1, wherein determining a resource measure for each of the basic instructions comprises:

accessing a set of calibration statistics, said calibration statistics specifying a resource measure for each basic instruction associated with a particular computer language.

4. The method of claim 3, wherein all of the resource measures in said calibration statistics pertain to processing resources consumed on a particular machine in which calibration was performed.

5. The method of claim 4, wherein said method is carried out on the particular machine in which calibration was performed.

6. The method of claim 4, wherein said method is carried out on a different machine than the particular machine in which calibration was performed.

7. The method of claim 3, wherein a resource measure for a basic instruction represents an average amount of processing resources consumed in executing that basic instruction once.

8. The method of claim 1, wherein said code segment is a line of source code.

9. The method of claim 1, wherein the set of computer code is profiled without requiring any profiling code that performs a profiling function to be added to the set of computer code.

10. A computer readable storage medium, comprising:

instructions for causing one or more processors to execute a set of computer code;
instructions for causing one or more processors to generate an execution log for the set of computer code, wherein the execution log comprises information indicating how many times a code segment within the set of computer code was executed;
instructions for causing one or more processors to select said code segment from the execution after execution of the set of computer code has completed;
instructions for causing one or more processors to access a decomposed representation of said code segment, said decomposed representation specifying one or more basic instructions that are executed to execute said code segment;
instructions for causing one or more processors to determine a resource measure for each of the basic instructions specified in said decomposed representation, wherein a resource measure for a basic instruction provides an indication of an amount of processing resources consumed in executing that basic instruction once;
instructions for causing one or more processors to derive, based upon said decomposed representation and the resource measures, an execution cost for said code segment, wherein said execution cost provides an indication of an amount of processing resources consumed in executing said code segment once; and
instructions for causing one or more processors to derive, based upon said execution cost and how many times said code segment was executed, a total execution cost for said code segment.

11. The computer readable storage medium of claim 10, wherein said execution cost is derived without invoking a timing mechanism.

12. The computer readable storage medium of claim 10, wherein the instructions for causing one or more processors to determine a resource measure for each of the basic instructions comprises:

instructions for causing one or more processors to access a set of calibration statistics, said calibration statistics specifying a resource measure for each basic instruction associated with a particular computer language.

13. The computer readable storage medium of claim 12, wherein all of the resource measures in said calibration statistics pertain to processing resources consumed on a particular machine in which calibration was performed.

14. The computer readable storage medium of claim 13, wherein said computer readable medium is a part of the particular machine in which calibration was performed.

15. The computer readable storage medium of claim 13, wherein said computer readable medium is a part of a different machine than the particular machine in which calibration was performed.

16. The computer readable storage medium of claim 12, wherein a resource measure for a basic instruction represents an average amount of processing resources consumed in executing that basic instruction once.

17. The computer readable storage medium of claim 10, wherein said code segment is a line of source code.

18. The computer readable storage medium of claim 10, wherein the computer readable medium does not comprise any instructions for causing one or more processor to add profiling code that performs a profiling function to the set of computer code.

* * * * *